DE WITT NELSON.
EMERGENCY TIRE.
APPLICATION FILED JAN. 27, 1908.
1,029,553.
Patented June 11, 1912.
2 SHEETS—SHEET 1.
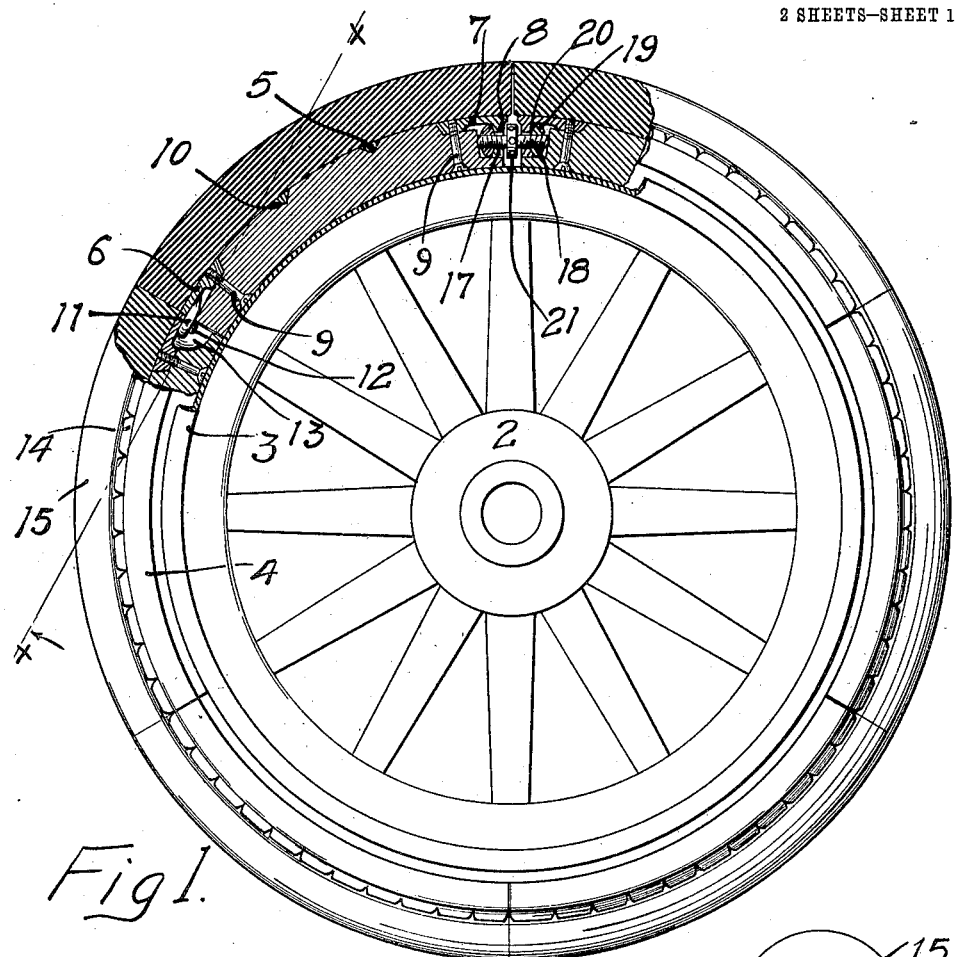
Fig 1.
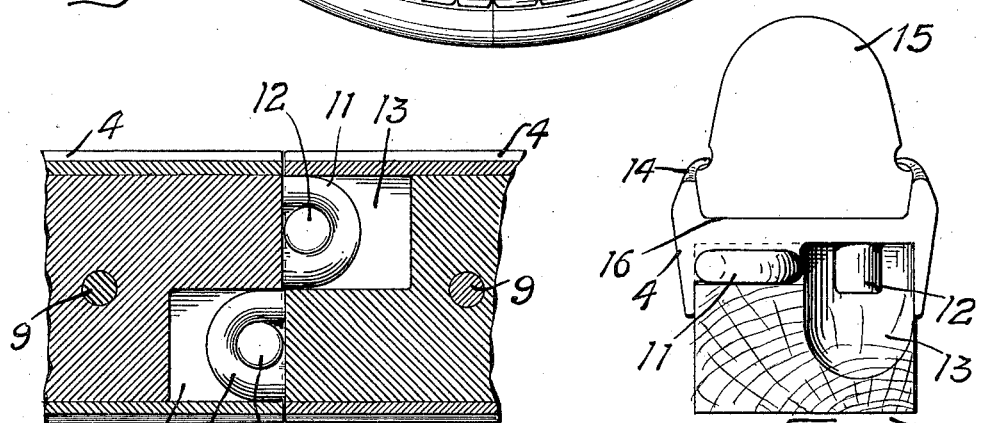
Fig 2. x-x
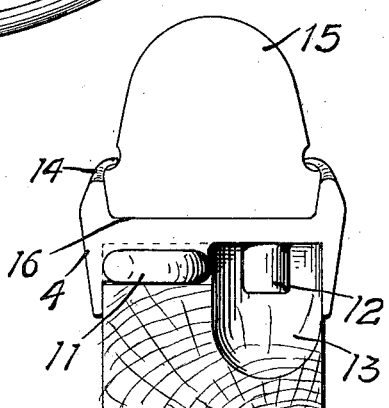
Fig 3.
WITNESSES
INVENTOR
DEWITT NELSON
BY
HIS ATTORNEYS DE WITT NELSON.
EMERGENCY TIRE.
APPLICATION FILED JAN. 27, 1908.
1,029,553.
Patented June 11, 1912.
2 SHEETS—SHEET 2.
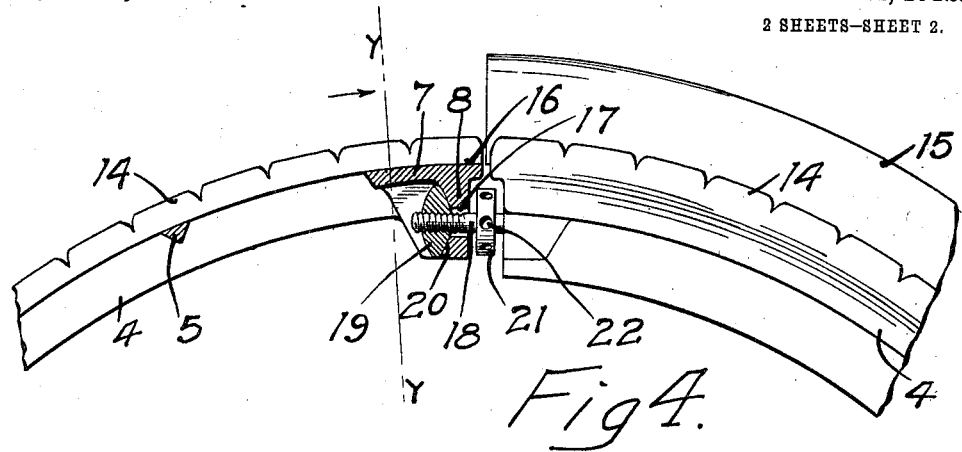
Fig 4.
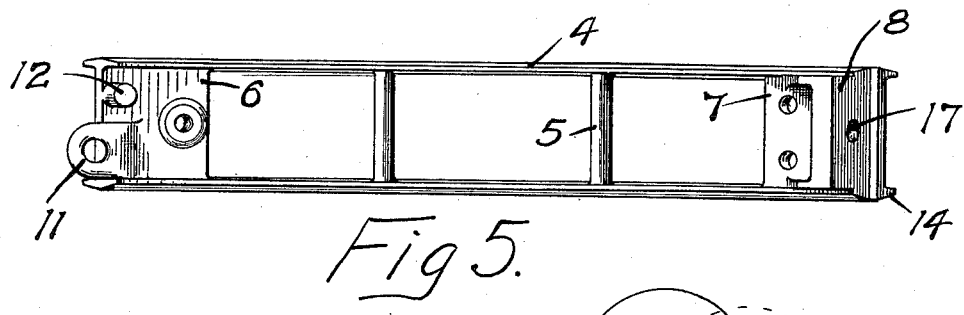
Fig 5.
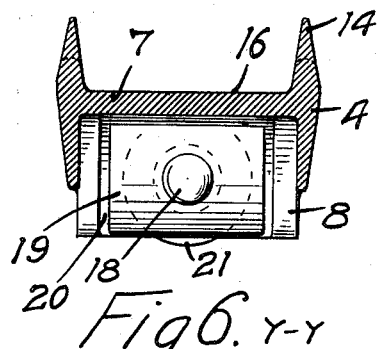
Fig 6. Y-Y
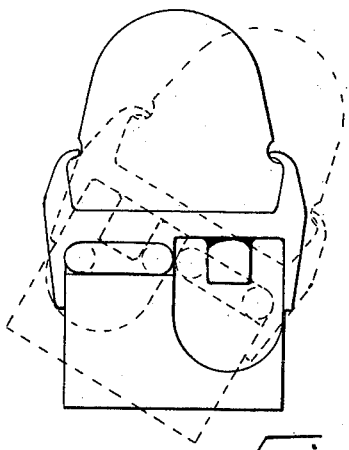
Fig 7.
WITNESSES
INVENTOR
DEWITT NELSON
BY Paul & Paul
HIS ATTORNEYS

UNITED STATES PATENT OFFICE.

DE WITT NELSON, OF MINNEAPOLIS, MINNESOTA.

EMERGENCY-TIRE.

1,029,553.  Specification of Letters Patent.  Patented June 11, 1912.

Application filed January 27, 1908. Serial No. 412,801.

*To all whom it may concern:*

Be it known that I, DE WITT NELSON, of Minneapolis, Hennepin county, Minnesota, have invented certain new and useful Improvements in Emergency-Tires, of which the following is a specification.

My invention relates to emergency tires designed particularly for automobile use and capable of being substituted for the ordinary pneumatic tire when it is rendered useless by a puncture or for any other reason, to enable the driver of the machine to operate the car without the necessity of running on the wheel rim.

A further object is to provide an emergency tire capable of application to any size and make of automobile wheel.

A further object is to provide a tire adapted to be separated and packed away in a small compass.

A further object is to provide an emergency tire which can be easily and quickly applied to a wheel and as readily removed.

My invention consists generally in various constructions and combinations, all as hereinafter described and particularly pointed out in the claims.

In the accompanying drawings, forming part of this specification, Figure 1 is a side elevation of a wheel with my emergency tire applied thereto, a portion of the tire being in section to illustrate the manner of securing it to the wheel. Fig. 2 is a sectional view on the line $x$—$x$ of Fig. 1. Fig. 3 is a detail sectional view illustrating the manner of securing the sections or segments of the tire together. Fig. 4 is an enlarged detail view illustrating the manner of locking the tire sections on the wheel. Fig. 5 is a detail view of the metallic frame in which the tire proper is mounted. Fig. 6 is a sectional view on the line $y$—$y$ of Fig. 4. Fig. 7 illustrates the manner of tilting the sections laterally to interlock them with one another.

In the drawing, 2 represents an automobile wheel having the usual rim 3 in which the pneumatic tire is seated. This rim is usually metallic and of comparatively light weight and serious damage often results to it and the wheel by running the machine with a tire removed. In my present invention I provide means whereby the wheel is rendered capable of service within a very short time after the pneumatic tire is removed.

In carrying out my invention I provide a series of skeleton metallic frames 4 curved to correspond to the periphery of a wheel and consisting of side bars and cross bars 5 connecting them near the middle of the frames. At the ends cross plates 6, 7 and 8 are provided which may be formed integrally with the side bars or not as preferred. To the plates 6 and 7 wooden fellies are secured by screws 9 that are counter sunk into the fellies, recesses 10 being provided in the fellies to receive the cross bars 5. These fellies are adapted to fit the rim of the wheel. Each of the plates 6 has an eye 11 formed thereon and a lug 12, the lugs and eyes being oppositely arranged in the adjoining segments of the tire so that the eye of one segment will receive the lug of the contiguous segments, recesses 13 being formed in the ends of the fellies to allow the insertion of the eyes therein. In connecting the segments of the tire together it is necessary to tilt them laterally as indicated in Fig. 7 so that the lug of one segment will enter its eye in the opposite segment, and when the segments are united it will be impossible for them to become accidentally separated as it will be necessary to tilt or partially rotate them before such separation can occur.

The metallic frames have flanges 14 formed thereon, the edges of which are adapted to be turned inwardly to grip the base of the hard rubber tire sections 15 that are fitted within seats 16 provided between the flanges 14. These flanges will hold the hard rubber sections firmly in place and prevent any possibility of their becoming detached from the fellies inclosed by them. At the same time this manner of securing the hard rubber tire sections allows them to be removed whenever it is necessary to repair or replace any of the sections.

The plates 8 are provided with holes 17, said plates being located in the abutting ends of contiguous sections. A stud 18 having right and left hand threads thereon extends through the holes 17 in said plates and into nuts 19 that are threaded to receive said stud, and have curved surfaces fitting correspondingly shaped seats 20 to allow the nuts to rock and seat themselves and the stud to accommodate itself to the curve of the tire sections. A bolt passing into rigid sockets and securing the tire sections together would bind or cramp when the sections were drawn up and considerable strain would fall on the bolt or stud while the wheel was in use. By providing the nuts with the curved bearing surfaces I am able to draw the sections of the tire snugly around the rim of the wheel without danger of cramping the stud or throwing any unusual or unnecessary strain thereon. A disk 21 is formed on the stud having sockets 22 to receive a pin and allow the operator of the machine to turn the stud and draw the tire sections together. The ends of the tire sections carrying the threaded stud are recessed, as indicated in Fig. 4 to allow sufficient room for the operation of the disk and stud.

There may be any desired number of the tire sections according to the size of the wheel and the space in which it is desired to pack the parts when not in use.

The tire sections are interchangeable and are all alike except that two of them are provided with a coupling means. It is not necessary therefore in assembling the tire to do any fitting or adjusting as the sections may be easily coupled together wherever placed on the wheel, it being merely necessary to arrange the sections with the coupling members contiguous to one another.

I claim as my invention:—

1. An emergency tire comprising tire sections having a coupling means at their ends, said coupling means being connected by partially rotating one of said sections, and means for drawing the coupled sections together.

2. An emergency tire comprising skeleton metallic frames and wooden rim sections secured thereto, said frames having seats for the tire sections and couplings at their ends included within the circumference of said sections, whereby the abutting ends of the sections may be connected together, and means for clamping the tire sections on a rim.

3. An emergency tire comprising metallic frames having seats therein for solid rubber sections, and flanges arranged to grip said sections, wooden rims provided on the opposite side of said frames from said rubber tire sections and means for securing them to said frames, and couplings provided at the abutting ends of said sections and whereby they are joined together, said coupling being united by partially rotating one of said sections.

4. An emergency tire comprising tire sections having eyes and lugs thereon, the eye and lug of one section being adapted to interlock with the corresponding eye and lug of the adjoining section by partially rotating one of said sections, whereby the sections are coupled together, and means for tightening the said sections around a wheel rim.

5. An emergency tire comprising tire sections and means for coupling them together, and means for drawing the said sections around a wheel rim, said means comprising a stud having right and left hand threads thereon, and burs having curved surfaces loosely mounted in said tire sections and having threaded holes to receive said stud.

6. An emergency tire comprising metallic frames having plates at one end and couplings mounted thereon, plates at the opposite ends of said frames having holes therein, a stud having right and left hand threads thereon fitting loosely within the holes of adjoining sections, burs having curved surfaces and threaded holes to receive said stud, and means for revolving said stud to tighten said couplings and draw said tire sections snugly around the wheel rim.

7. An emergency tire consisting of sections having frames and fellies secured thereto, and tread sections mounted in said frames, said fellies having recesses in their ends and coupling means for uniting the abutting ends of adjoining sections, said coupling means being connected by rotating one of the sections partially to allow its coupling member to engage the member of the other section, and means for drawing said tire sections snugly around the wheel rim.

In witness whereof, I have hereunto set my hand this 24th day of January 1908.

DE WITT NELSON.

Witnesses:
RICHARD PAUL,
J. A. BYINGTON.

---

Copies of this patent may be obtained for five cents each, by addressing the "Commissioner of Patents, Washington, D. C."